US005339997A

United States Patent [19]

Billivant et al.

[11] Patent Number: 5,339,997

[45] Date of Patent: Aug. 23, 1994

[54] MECHANICAL FEEDER HAVING A HEMISPHERICAL HOPPER

[75] Inventors: Kenneth W. Billivant, Chadds Ford, Pa.; Friedrich Preiser, Sewell, N.J.

[73] Assignee: K-Tron Technologies, Inc., Wilmington, Del.

[21] Appl. No.: 967,989

[22] Filed: Oct. 28, 1992

[51] Int. Cl.⁵ .............................................. G01F 11/20

[52] U.S. Cl. .................................... 222/238; 222/413; 366/186; 366/331; 366/343

[58] Field of Search ............... 222/236, 238, 241, 412, 222/413; 366/186, 96–99, 248, 331, 343, 205, 314

[56] References Cited

U.S. PATENT DOCUMENTS

| | | | |
|---|---|---|---|
| 1,757,832 | 5/1930 | Goebels . | |
| 2,481,731 | 9/1949 | Dubin | 366/331 |
| 3,142,419 | 7/1964 | Burke | 222/413 X |
| 3,548,903 | 12/1970 | Holly | 366/186 X |
| 3,913,796 | 10/1975 | Aoki | 222/238 |
| 4,185,072 | 1/1980 | Puderbaugh et al. | 366/248 X |
| 4,199,266 | 4/1980 | Giusti | 366/296 |
| 4,275,808 | 6/1981 | Bullivant et al. | 222/238 X |
| 4,493,442 | 1/1985 | Hanson, Jr. | 222/412 X |
| 4,804,111 | 2/1989 | Ricciardi et al. | 222/238 X |

FOREIGN PATENT DOCUMENTS

| | | |
|---|---|---|
| 0022090 | 1/1981 | European Pat. Off. . |
| 2061503 | 6/1972 | Fed. Rep. of Germany . |

*Primary Examiner*—Kevin P. Shaver
*Attorney, Agent, or Firm*—Ratner & Prestia

[57] ABSTRACT

A feeder for controllably discharging a flowable substance and having a hemispherically shaped hopper for holding a flowable substance, a rotatable agitator for sweeping the hopper and agitating the substance, a trough for receiving the substance from the hopper, a rotatable feed screw for removing the substance from the hopper and controllably discharging the substance from the feeder, and a driving mechanism for driving the feed screw and agitator. The agitator is horizontally driven along an axis which is parallel to axis of the feed screw and is removable from the feeder.

24 Claims, 4 Drawing Sheets

MECHANICAL FEEDER HAVING A HEMISPHERICAL HOPPER

FIELD OF THE INVENTION

The present invention relates to machines for measuring and dispensing flowable solid substances.

BACKGROUND OF THE INVENTION

Materials, such as powders, pellets, granules, fibers, and flakes, generally referred to as flowable solids, require special handling equipment for measurement and feeding. In response to this need, a number of products have been developed. The feeders and meters developed for flowable solids come in a variety of configurations. Generally, the flowable solid material is held in a hopper with a feed screw positioned at the bottom opening of the hopper. The screw turns at a selected speed and delivers the material which flows from the hopper through a discharge opening. The flow rate of the material may be measured in a number of different ways.

For example, the volumetric feeding principle can be used to measure and control the flow rate of material. Bulk material is discharged from the hopper to a feed screw so that a constant volume is fed per unit of time. The feed rate is determined through calibration: a time sample is taken and weighed and screw speed is adjusted accordingly. Feeding accuracy depends on the uniformity of the bulk material, its handling behavior, and consistent bulk density.

Alternatively, a loss-in-weight feeder principle may be used to measure and control the flow rate of material. The discharge unit, the hopper, and the product to be fed are placed on a scale or suspended in a weighing system. The total weight is stored in a computer controller memory. As bulk material is discharged by the feed screw, the weight difference per unit of time is continually measured. The measured actual value is compared with the desired value. The feeder is controlled by varying the discharge speed to make adjustments, for example, for changes in bulk density. The loss-in-weight feeder principle is the most accurate system because its computations are always based on actual weight changes.

Finally, a weight belt feeder principle can be used. Bulk material is discharged from a hopper to a driven belt across a weigh bridge. The weight acting on the weigh bridge is measured, and a computer computes the feed rate, based on weight and the belt speed. The throughput is regulated to the desired value by varying the belt speed.

Though these three different feeding principles work somewhat differently, generally, all use a hopper with a feed screw at the discharge of the hopper which moves material from the hopper and discharges the material. An example of a prior art feeder using this principle is shown in FIG. 1. Such a prior art feeder comprises a hopper 10 which holds the material to be dispensed. A pair of feed screws 14 move the material from the hopper to a discharge 16. An agitator 20 rotates to keep the material to be dispensed free-flowing and away from the sides of the hopper 10. Agitator 20 is driven by a shaft 22 which is disposed horizontally, parallel to the long axis of feed screws 14. Thus, one motor and a gear box 30 can provide power both to feed screws 14 and shaft 22. The hopper shown in FIG. 1 has a roughly semi-cylindrical cross section, which allows a horizontally driven agitator to sweep the lower portion thereof to dislodge materials. This design necessarily includes a rectangular opening 35. To this opening can be attached a larger storage bin, not shown.

A problem arises with rectangular openings when the material being fed through the opening has a tendency to bridge. In such a situation, the material can form a bridge across the short side of opening 35 (i.e., the material will pack against the long sides of the opening and form a bridge spanning the opening). When this occurs, the material being fed will cease feeding and the bridge must be broken up manually. Bridging also tends to occur near the opening leading to feed screws 14. For this reason, agitator 20 should pass as close to feed screws 14 as possible to break up any bridges.

In an alternative configuration, hopper 10 may be shaped conically, with the point of the cone downward. This provides a circular opening which reduces the tendency of a material to bridge. However in such a case, a horizontally driven agitator is not possible. Therefore, a separate motor is generally attached to the cover for the hopper, and the motor, with a vertically disposed drive shaft, drives an agitator. This is undesirable since it adds an extra drive system and therefore extra cost and complexity to the feeder. It is possible to use a mechanical arrangement to transmit power from the motor which drives the feed screws, however this too is a complex arrangement and inflexible with respect to a change in the hopper size.

SUMMARY OF THE INVENTION

Therefore, a feeder which overcomes these difficulties by providing a hopper which has a circular opening but which still enables using a horizontally driven agitator is highly desirable.

A feeder for controllably discharging a flowable substance, constructed in accordance with the present invention, includes a hemispherically shaped hopper for holding a flowable substance, a rotatable agitator for sweeping the hopper and agitating the substance, a trough for receiving the substance from the hopper, and a rotatable screw for moving the substance discharged from a discharge outlet at the bottom of the hopper and controllably discharging the substance from the feeder. The feeder also includes means for driving the screw and agitator. Preferably, the agitator is horizontally driven and is removable from the feeder.

DETAILED DESCRIPTION OF THE INVENTION

Figure 2:
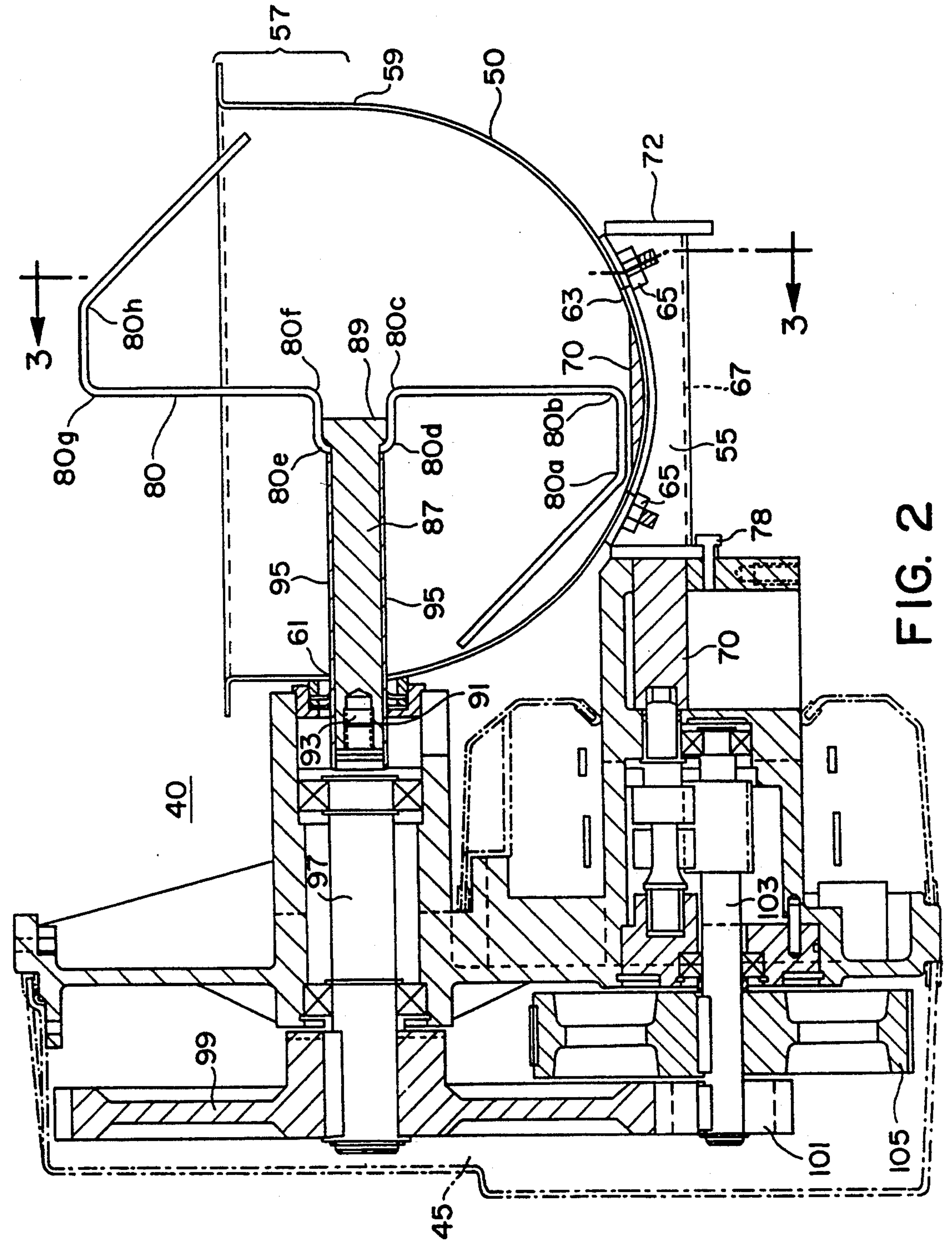
FIG. 2 is a cross-sectional side view of a feeder of the present invention.

Referring now to FIG. 2, a feeder 40, constructed in accordance with the present invention, includes a housing 45, a hopper 50, and a trough 55. The hopper 50 has a lower portion which is hemispherical in shape and an upper portion 57 which extends vertically upwards from the upper end 59 of the hemispherical lower portion. Hopper 50 also has a drive shaft opening 61 and a hopper discharge opening 63. Hopper 50 is secured to trough 55 by means of bolts 65, or other conventional fastening means at hopper discharge opening 63. Trough 55 and the connection to hopper 50 may be more clearly seen from FIG. 3.

Figure 3:
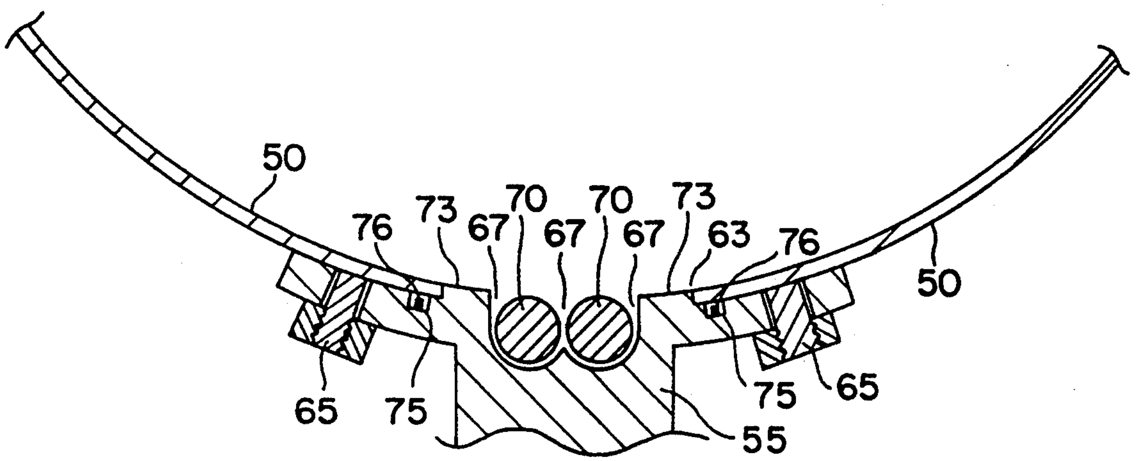
FIG. 3 is a partial cross-sectional view showing the hopper and trough taken along the line 3—3 in FIG. 2.

FIG. 3 shows trough 55 having a channel 67 extending therethrough. Located within channel 67 are a pair of feed screws 70. As these feed screws 70 are rotated, material is pushed through channel 67 by the feed screws 70 to a trough discharge opening 72 shown in FIG. 2. Hopper discharge opening 63 in hopper 50 is larger than channel 67 in trough 55 in the configuration shown in FIG. 3. This is because the feed screws 70 shown in FIG. 3 are small feed screws. However, larger feed screws may also be used with the same hopper 50. For this reason, discharge opening 63 is large enough to accommodate a trough adapted to hold the largest feed screws which could be utilized with the hopper or a large single feed screw. In cases where discharge opening 63 is larger than optimal for the feed screws 70 selected, as in the hopper shown in FIGS. 2 and 3, trough 55 includes a curved portion 73 which is hemispherically shaped and fitted within hopper discharge opening 63 and extends to the edges of the hopper discharge opening to continue the hemispherical shape of hopper 50 until channel 67 is reached. For larger feed screws, this curved portion 73 may be smaller or eliminated entirely depending on the optimum configuration for channel 67 to accommodate feed screws 70.

Figure 4:
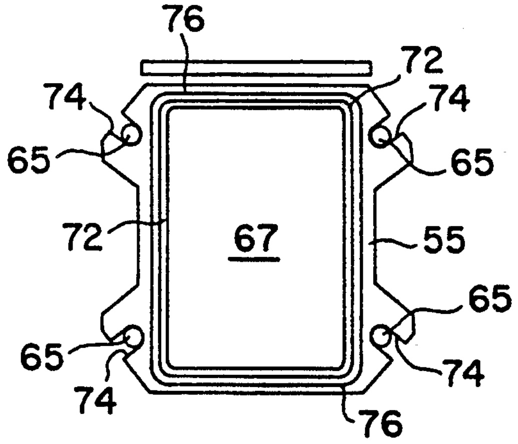
FIG. 4 is a plan view of the trough of the present invention.

As can also be seen from FIG. 3, bolts 65 extend from hopper 50 perpendicularly to the surface of hopper 50 at the point of attachment. There are four such bolts 65 extending from hopper 50. Accordingly, as may be seen from FIG. 4, trough 55 includes mounting brackets 74 which are U-shaped and open at one end in order to receive bolts 65. Alternatively, trough 55 can be brazed onto hopper 50 if permanent attachment is desired, in which case, bolts 65 can be eliminated. As can also be seen from FIG. 4, channel 67 may essentially be the entire width of discharge opening 63 with only a very small rim comprising curved portion 72. Trough 55 also has a channel 75 within which an O-ring 76 is fitted which seals trough 55 to hopper discharge opening 63 to prevent leakage of material. As may be seen from FIG. 2, trough 55 is secured to housing 45 by bolts 78.

Turning back to FIG. 2, feeder 40 also includes an agitator 80 which rotates to keep the material to be dispensed free-flowing and away from the sides of the hopper. Agitator 80 rotates and disturbs material within hopper 50 and material tending to cling to the sides of hopper 50. It is most desirable for an agitator to be horizontally driven. This is so because a horizontally driven agitator will allow larger hoppers or material handlers to be placed on top of hopper 50 without any mechanical linkage to be accounted for. Furthermore, a horizontally driven agitator can be driven by the same motor which drives feed screws 70.

An agitator for a hemispherical hopper, when rotating, should describe a sphere as closely as possible. Agitator 80 cannot describe exactly a sphere when rotated about its axis since feed screw 70 intrude slightly into hopper 50, and allowance for the feed screws 70 must be made in the shape of agitator 80. However, agitator 80 has been designed so that, upon rotation, it will describe a truncated sphere with flat upper and lower ends to allow for the intrusion of feed screw 70 into hopper 50.

Figure 5:
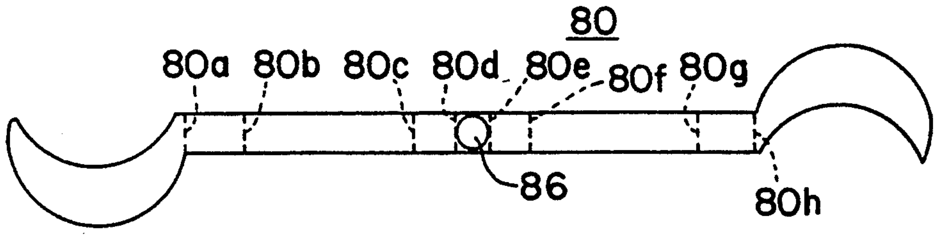
FIG. 5 is a plan view of the agitator of the present invention, before bending.

FIG. 5 shows agitator 80 prior to being bent into the shape shown in FIG. 2. Agitator 80 begins as a flat piece of metal of the shape shown in FIG. 5. The bends placed in the metal have been labeled **80*a* through 80*h* and the corresponding bends have been labeled in FIG. 2 from which the configuration of agitator 80 is readily apparent. The bends in the flat metal agitator 80 are simple bends without twists. However, due to the curved hemispherical shape of hopper 50, the curved ends of agitator 80 (outside of bends 80*a* and 80*h*) pass quite close to hopper. Also due to the shape of hopper 50 and agitator 80, as agitator 80 rotates, scraping the sides of hopper 50, it tends to move material away from the sides of the hopper toward the center of hopper 50. In this way, material is always moving towards the center of hopper 50, toward screws 70 which aids in emptying hopper 50 and preventing stagnation of material. Agitator 80 also has a mounting hole 86 for mounting the agitator in feeder 40**.

The particular configuration of the agitator and the pieces used to mount the agitator are important. As previously stated, hopper 50 is mounted to trough 55 by bolts 65. The agitator is mounted through drive shaft opening 61. Thus, the hopper cannot be installed and removed with agitator 80 in place, and agitator 80 preferably is removable without removal of hopper 50.

Figure 1:
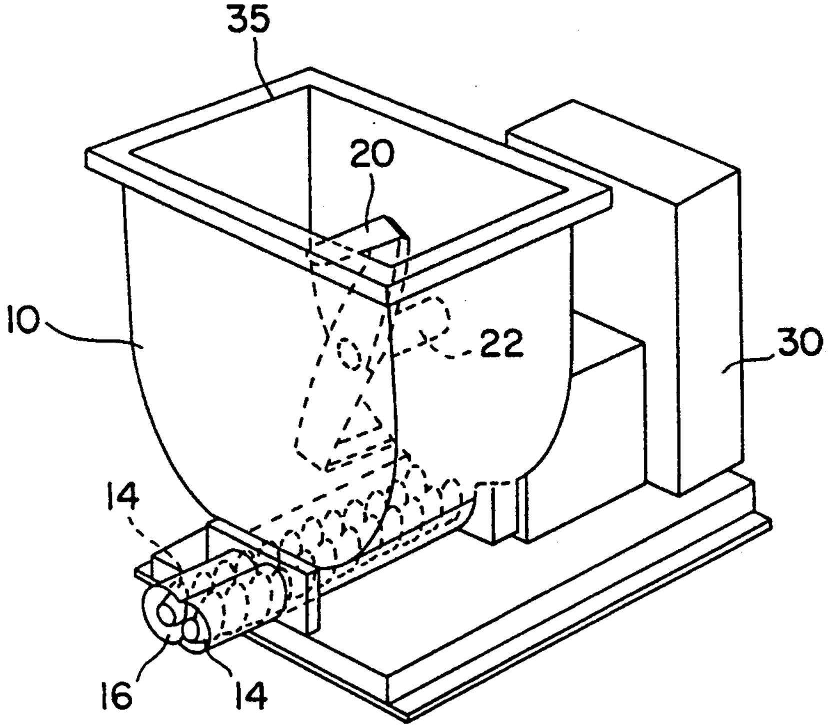
FIG. 1 PRIOR ART
FIG. 1 is a perspective view of a prior art feeder.

In some prior art feeders, where the hopper was shaped in the form of a semi-cylindrical section (see FIG. 1), the hopper included a removable front access panel through which the agitator can be removed. Because of the complexity and difficulty in making a removable panel for a hemispherical hopper, an access panel is impractical. Therefore, the configuration and mounting of agitator 80 preferably allows for removal of the agitator without removal of the hopper.

Figure 6:
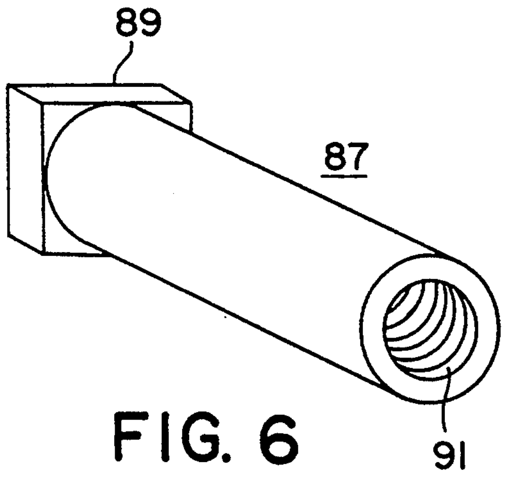
FIG. 6 is a perspective view of the threaded fastener used with the agitator of the present invention.

Agitator 80 is held in place by a fastener 87 having an internally threaded portion extending away from its point end. Fastener 87 , which is shown in FIG. 6, has a square head 89 which fits within the bends of agitator 80. By means of the internal threads 91, fastener 87 can be tightened onto a threaded member 93 which rotates in a bearing 94, whereby fastener 87 is secured in feeder 40 to hold agitator 80 in place. Surrounding the fastener 87 is an outer sleeve 95 shown in FIG. 2. This outer sleeve 95 holds agitator 80 tightly against the head 89 of fastener 87. Alternatively, fastener 87 may have a male end thereof and threaded member 93 may be replaced by an internally threaded component to receive the male end of fastener 87.

To remove the agitator 80, the power to the feeder is turned off and agitator 80 is rotated by hand, which turns and unscrews fastener 87 from the threaded member 93. The square shape of head 89 engaging a correspondingly square shaped portion bent into agitator 80 makes the agitator wrenchable to unscrew fastener 87. Head 89 may also have a shape adapted to interlock with agitator 80 in other ways which allow axial displacement but not rotation, including a slot in agitator 80 and corresponding shape on head 89 or an "H" shaped cast head 89 which engages the outer portion of agitator 80. Fastener 87 can then be drawn out of outer sleeve 95 and removed. Agitator 80 can then be removed, and outer sleeve 95 can be withdrawn out of drive shaft opening 61 and removed. At this point, hopper 50 can then be removed as well.

The agitator 80 is driven by a drive shaft 97. Drive shaft 97 in turn receives power from agitator gear 99 which in turn receives power from drive gear 101 which is attached to main drive shaft 103. Main drive shaft 103 also drives feed screw 70, and receives power from a motor (not shown) through a gear 105. In this way, the rotation of agitator 80 is coupled to the rotation of feed screw 70 and the two, by being driven along parallel axes, can share a common drive.

It is understood that various other modifications will be apparent to and can readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed:

1. A feeder for controllably discharging a flowable substance comprising:

a hemispherically shaped hopper for holding said flowable substance, said hopper having an elongated discharge opening at the bottom thereof for discharging said flowable substance;

a rotatable agitator for disturbing said flowable substance within said hopper and said flowable substance tending to cling to the sides of said hopper;

an elongated trough having an inlet opening for receiving said flowable substance from said hopper;

a rotatable screw for moving said flowable substance through said trough and controllably discharging said flowable substance from said feeder; and means for driving said rotatable screw and agitator.

2. A feeder according to claim 1 wherein said agitator and said rotatable screw are driven along parallel axes.

3. A feeder according to claim 2 wherein said parallel axes are horizontal.

4. A feeder according to claim 3 wherein said agitator and hopper are removeable from said feeder.

5. A feeder according to claim 4 wherein said agitator is formed from a single piece of metal having a plurality of bends; said agitator is secured by a removable shaft which extends through only one wall of said hopper, and said agitator is secured to said means for driving said agitator by a fastener locked within said bends of said agitator.

6. A feeder according to claim 1 wherein said agitator is formed from a single piece of metal having a plurality of bends.

7. A feeder according to claim 6 wherein said agitator and hopper are removeable from said feeder.

8. A feeder according to claim 7 wherein said rotatable agitator is shaped to describe a truncated sphere when rotated.

9. A feeder according to claim 7 wherein said agitator is secured to said means for driving said agitator by a fastener locked within said bends of said agitator, and said agitator is secured by a removable shaft which extends through only one wall of said hopper.

10. A feeder according to claim 1 wherein said hopper has a lower portion which is hemispherical in shape and an upper portion which extends vertically upwards from the upper end of said hemispherical lower portion.

11. A feeder for controllably discharging a flowable substance comprising:

a hopper, including a vertically disposed, hemispherically shaped portion, for holding said flowable substance and having an elongated discharge opening at the bottom thereof for discharging said flowable substance;

a rotatable agitator within said hopper for disturbing said flowable substance within said hopper and said flowable substance tending to cling to the sides of hopper;

an elongated trough positioned beneath said hopper and having an inlet opening at the top thereof and beneath said hopper discharge opening for receiving said flowable substance from said hopper;

feed screw means within said trough for moving said flowable substance through said trough and controllably discharging said flowable substance from said feeder; and drive means for driving said rotatable screw and agitator.

12. The feeder of claim 11 wherein said rotatable agitator is adapted to move material away from said sides and toward the center of said hopper.

13. A feeder according to claim 11 wherein said drive means includes a drive shaft extending through a wall of said hopper to said agitator.

14. A feeder according to claim 13 wherein said drive means are adapted to be connected to a single motor.

15. A feeder according to claim 14 wherein said feed screw means include a pair of feed screws disposed parallel to each other and parallel to said drive shaft.

16. A feeder according to claim 14 wherein said trough has a rectangular horizontal cross-section and said feed screws extend along the length of said trough.

17. A feeder according to claim 15 wherein said hopper further includes a vertically disposed cylindrical portion extending upwards from said hemispherically shaped portion.

18. A feeder according to claim 15 wherein said drive shaft extends through a wall of said vertically disposed cylindrical portion of said hopper.

19. A feeder according to claim 11 wherein said agitator is formed from a single piece of metal having a plurality of bends.

20. A feeder according to claim 19 wherein said agitator and hopper are removeable from said feeder.

21. A feeder according to claim 20 wherein said rotatable agitator is shaped to describe a truncated sphere when rotated.

22. A feeder according to claim 20 wherein said agitator is secured to said means for driving said agitator by a fastener locked within said bends of said agitator, and said agitator is secured by a removable shaft which extends through only one wall of said hopper.

23. A feeder for controllably discharging a flowable substance comprising:

a hemispherically shaped hopper for holding said flowable substance, said hopper having a discharge opening at the bottom thereof for discharging said flowable substance;

a rotatable agitator for disturbing said flowable substance within said hopper and said flowable substance tending to cling to the sides of said hopper;

a trough having:

(a) an inlet opening for receiving said flowable substance from said hopper which inlet opening is smaller than said hopper discharge opening, and (b) a hemispherically shaped portion fitted within and extending to the edges of said hopper discharge opening which portion continues the shape of said hopper;

a rotatable screw for moving said flowable substance, through said trough and controllably discharging said flowable substance from said feeder; and means for driving said rotatable screw and agitator.

24. A feeder for controllably discharging a flowable substance comprising:

a hopper, including a vertically disposed, hemispherically shaped portion, for holding said flowable substance and having a discharge opening at the bottom thereof for discharging said flowable substance;

a rotatable agitator within said hopper for disturbing said flowable substance within said hopper and said flowable substance tending to cling to the sides of hopper;

a trough positioned beneath said hopper and having:

(a) an inlet opening at the top thereof and beneath said hopper discharge opening for receiving said flowable substance from said hopper which inlet opening is smaller than said hopper discharge opening, and (b) a hemispherically shaped portion fitted within and extending to the edges of said hopper discharge opening which portion continues the shape of said hopper;

feed screw means, including a pair of feed screws disposed parallel to each other, for moving said flowable substance through said trough and controllably discharging said flowable substance from said feeder; and drive means:

(a) for driving said rotatable screw and said agitator, (b) including a drive shaft extending through a wall of said hopper to said agitator parallel to said feed screws, and (c) adapted to be connected to a single motor.

* * * * *

UNITED STATES PATENT AND TRADEMARK OFFICE
CERTIFICATE OF CORRECTION

PATENT NO. : 5,339,997
DATED : August 23, 1994
INVENTOR(S) : Kenneth W. Bullivant, Friedrich Preiser It is certified that error appears in the above-identified patent and that said Letters Patent is hereby corrected as shown below:

On title page, item [19] the
name of the Patentee should be changed from "Billivant et al." to --Bullivant et al.--

Item [75] should be
changed from "Kenneth W. Billivant" to --Kenneth W. Bullivant--

Signed and Sealed this

Twenty-ninth Day of November, 1994

Attest:

BRUCE LEHMAN

*Attesting Officer*

*Commissioner of Patents and Trademarks*